United States Patent
Wirth

(10) Patent No.: US 6,742,233 B2
(45) Date of Patent: Jun. 1, 2004

(54) METHOD OF MAKING A FRICTION RING FOR A BRAKE DISK

(75) Inventor: Xaver Wirth, Munich (DE)

(73) Assignee: Knorr-Bremse Systeme Für Schienenfahrzeuge GmbH, Munich (DE)

(*) Notice: Subject to any disclaimer, the term of this patent is extended or adjusted under 35 U.S.C. 154(b) by 0 days.

(21) Appl. No.: 10/141,827

(22) Filed: May 10, 2002

(65) Prior Publication Data

US 2002/0125083 A1 Sep. 12, 2002

Related U.S. Application Data

(62) Division of application No. 09/709,718, filed on Nov. 13, 2000, now Pat. No. 6,557,672.

(30) Foreign Application Priority Data

Nov. 12, 1999 (DE) .......................... 199 54 585

(51) Int. Cl.[7] .................. B23P 17/00; F16D 65/12
(52) U.S. Cl. .............. 29/412; 29/416; 29/525.01; 29/557; 83/53; 188/218 XL
(58) Field of Search .................. 29/412–416, 434, 29/525.01, 525.13, 557; 188/218 XL, 73.2, 58–59, 250 G, 250 B, 251 R, 218 A; 83/53

(56) References Cited

U.S. PATENT DOCUMENTS

| | | | |
|---|---|---|---|
| 3,314,509 A | | 4/1967 | Pelikan |
| 3,422,936 A | | 1/1969 | Marcheron |
| 4,827,679 A | * | 5/1989 | Earle, III ................ 83/53 |
| 5,031,739 A | | 7/1991 | Flotow et al. |
| 5,199,342 A | * | 4/1993 | Hediger ................ 83/53 |
| 5,439,077 A | | 8/1995 | Wirth |
| 5,626,211 A | * | 5/1997 | Gewelber et al. ......... 188/218 |
| 5,864,935 A | * | 2/1999 | Baumgartner et al. ..... 29/416 |
| 5,869,411 A | * | 2/1999 | Bazshushtari et al. .... 442/340 |

FOREIGN PATENT DOCUMENTS

| | | |
|---|---|---|
| DE | WO 93/21453 | 4/1993 |
| DE | 19954585 A1 | 5/2001 |
| EP | 0 166 879 B1 | 4/1985 |
| EP | 0 166 879 A1 | 4/1985 |
| EP | 0636217 B1 | 4/1993 |
| EP | 0699845 A1 | 3/1996 |
| EP | 1099872 A2 | 5/2001 |
| JP | 405162078 A * | 6/1993 ........... 83/53 |

* cited by examiner

Primary Examiner—David P. Bryant
Assistant Examiner—Jermie E. Cozart
(74) Attorney, Agent, or Firm—Barnes & Thornburg LLP

(57) ABSTRACT

The invention is a brake disk and a method of producing the same. The brake disk has at least one friction ring which can be engaged by a brake shoe on at least one side. The friction ring is divided into at least two ring segments having mutually facing end areas configured to be coupled with one another adjacent a junction and separation area. A separation gap is formed between the mutually facing end areas, which mesh with one another. At least one connection device is positioned in the junction and separation area for coupling the ring segments together.

13 Claims, 7 Drawing Sheets

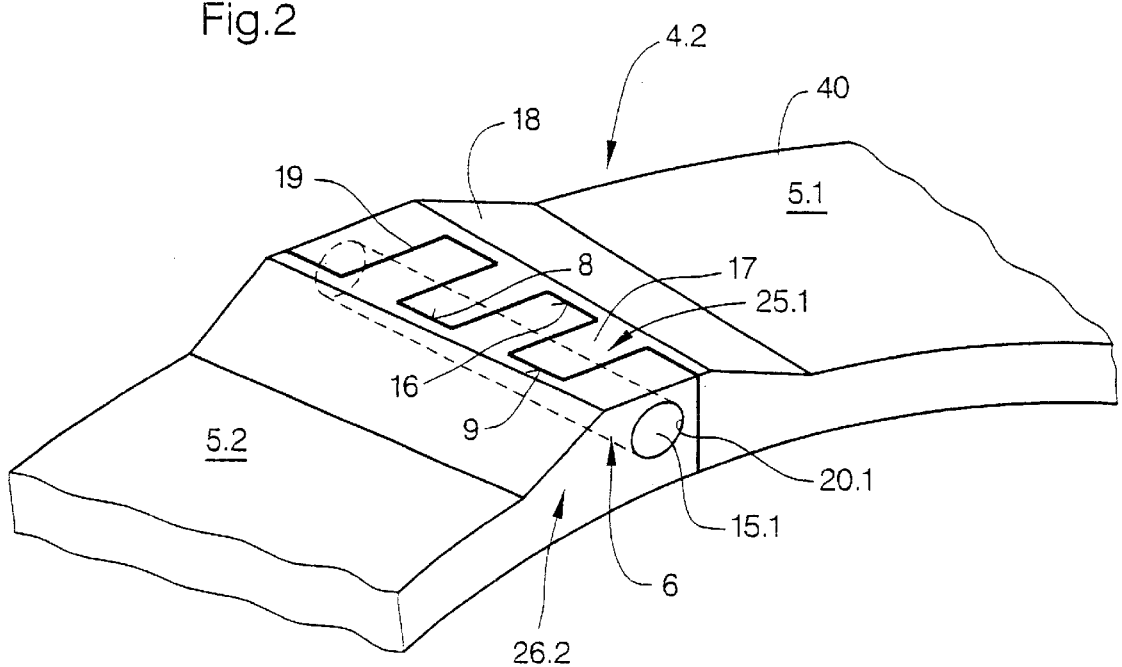

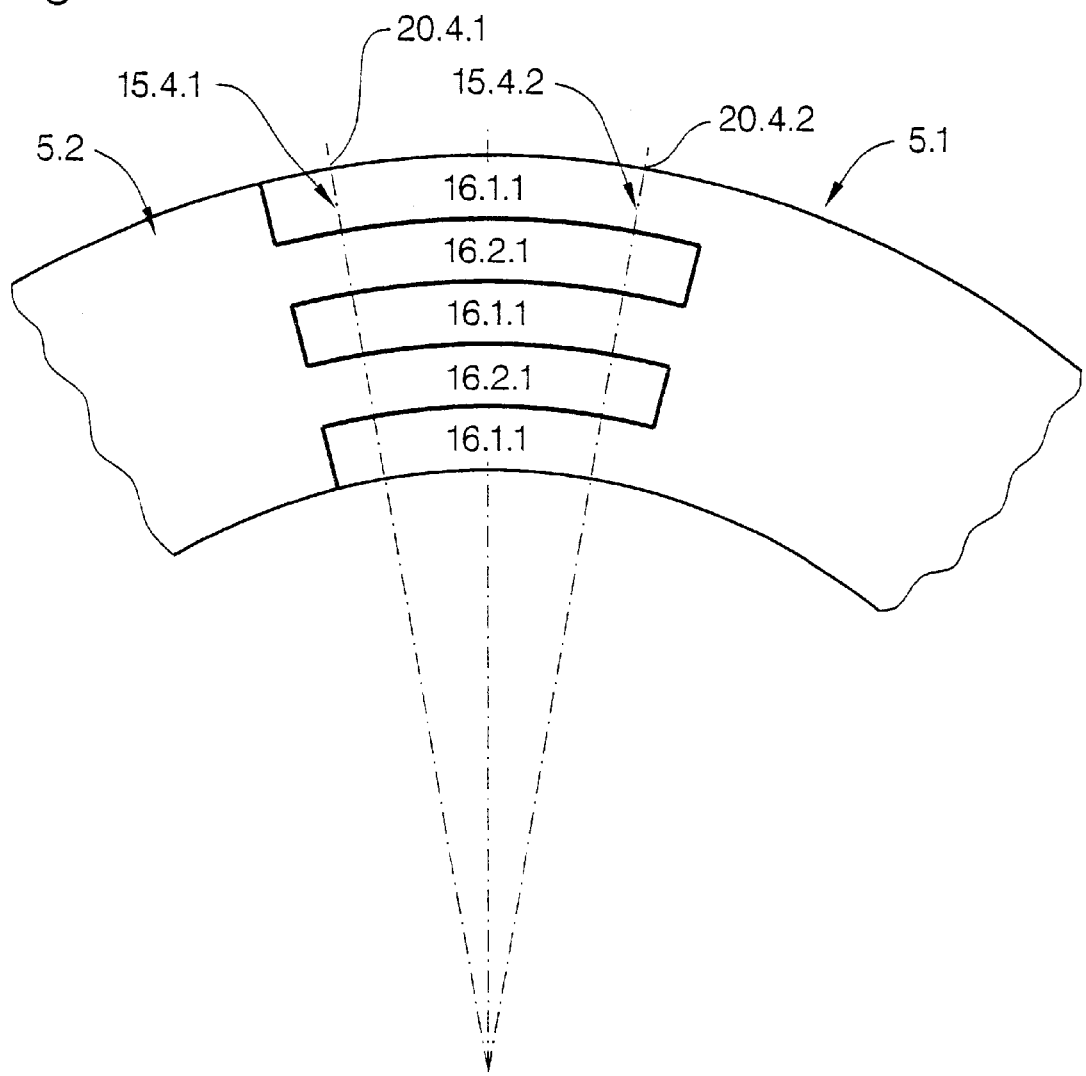

METHOD OF MAKING A FRICTION RING FOR A BRAKE DISK

This is a Divisional Application of application Ser. No. 09/709,718 filed Nov. 13, 2000, now issued as U.S. Pat. No. 6,557,672.

The invention relates to a brake disk and method for producing a friction ring, particularly for brake disks having friction rings constructed of more than one ring part, particularly axle brake disks for rail vehicles having two axially offset ring bodies divided corresponding to the friction ring and a method for their manufacturing are known in a plurality of constructions.

Patent Document DE 43 08 910 C2 discloses a brake disk for disk brakes with a friction ring which can be acted upon on one side by at least one brake shoe and has at least two friction ring segments. Each ring segment is held on a carrier body by connection elements which prevent radial relative displacements of the ring segments. The friction ring also has recesses on at least one side which are open toward the carrier body and are symmetrically arranged with respect to the junction points of the ring segments. The recesses are shallower than the width of the ring segments.

Furthermore, the friction ring has ring grooves as recesses which are arranged bridging the junction points and whose axes extend parallel to the axis of the friction ring, in which case a ring body can be inserted in each ring groove and fills the ring groove at least approximately completely and bridges the junction point. This arrangement prevents the junction point between the two ring segments from growing wider in the event of an occurrence of high centrifugal or other forces. Relative radial displacements also avoided. The connection elements as constructed require virtually no additional installation space.

However, this solution is very costly to make because the recesses and ring bodies must be precisely cut. Furthermore, in addition to the division, an additional high-expenditure machining of the ring segments is required. A casting is also conceivable, but requires a special casting mold.

European Patent Document EP 0 166 879 B1 shows a brake disk with a divided friction ring, particularly an axle brake disk for rail vehicles having two axially offset ring bodies divided corresponding to the friction ring. Two mutually axially opposite ring bodies are connected with one another by radially extending ribs. A screwed connection bridges the mold seam between the friction ring parts with prestress, the mutually opposite faces of the friction ring parts in the areas of the screwed connection and their lateral boundary resting against one another but have a distance from one another in the remaining areas. The screwed connection enables the ring bodies to experience a secure connection with no gaps in the friction surfaces of the brake disk. In addition, unintentional deformations of the ring bodies and the buildup of excess tensions is avoided. This solution is also costly to make.

European Patent Document EP 0 636 217 B1 shows a one-piece brake disk with two separation zones dividing it into two parts. Subsequently, a fastening device is positioned on each separating zone and extends over this separating zone. Finally the brake disk is broken at the separating zones into two semicircular parts. This method is relatively inexpensive because the brake disk itself can be manufactured at low cost, and the replacement of a worn-out brake disk with a new brake disk is quite simple. However, corresponding connection elements must be provided to prevent relative displacement of the ring segments. Another significant disadvantage is that this method can only be used for brake disks made from brittle materials, such as gray cast iron. Furthermore, these brittle friction rings must be thick and heavy in order to avoid fracture. As a result, such friction rings are not suitable for a use in rail vehicles because, as a rule, only wide friction rings are used there. However, these cannot be broken but at most can be destroyed. Another disadvantage is the resulting further development of the profile surface. However, the breakage zone does not prevent unevennesses in the surface of the friction ring. Therefore, deeper zones of wear may occur, which may result in an uneven wearing of the brake linings.

Furthermore, the solutions described in the indicated patent documents are not cost-effective for the manufacturing of brake disks of a small width and their design for higher speeds.

The present invention further develops a brake disk having a divided friction ring such that the disadvantages indicated in the prior art are avoided. Simple devices are used such that the junction point between two ring segments cannot widen even when high centrifugal forces or other forces occur, and simultaneously an axial and radial displacement relative to one another is avoided. The connection elements require virtually no additional installation space, so that the brake disk can also be constructed to be unventilated or with only short cooling ribs. Furthermore, this brake disk is inexpensive to make.

The brake disk comprises a friction ring having at least two ring segments—a first ring segment and a second ring segment. The ring segments are produced by a mechanical separation process from a one-piece or one-part ring-shaped basic body. According to the invention, the separation of the ring segments from the basic body is done by a hydrocutting method, particularly a water torch cutting method. The separating line is constructed such that the end areas engage in one another while forming a separation gap therebetween.

The area of contact between the segments is called a junction area or separation area. In this case, the term "junction area" relates to the meeting of the mutually opposite surfaces of the two mutually adjacent ring segments under stress, while these surfaces are to be assigned to the "separation area" under the aspect of the course of the separating line of the ring-shaped basic element in the circumferential direction. The adjacent ring segments are coupled with one another in the separation or junction area by means of at least one connection element. The at least one connection element extends along and passes through at least a partial area of the end areas of the ring segments. This reduces the space requirement for the installation of the connection elements. When the brake lining is in contact with the friction ring, the connection elements do not project beyond the latter and cannot damage the brake lining.

The meshing of the individual ring segments in the junction or separation area is accomplished by protrusions and recesses are formed on the respective mutually opposite separation surfaces of the individual friction ring segments. These protrusions and recesses are complementarily formed so that the protrusions of one segment engage in recesses on the other ring segment.

The method according to the invention has a minimal number of required process steps and a low requirement of installation space and at low cost. The basic element may already be finished with respect to its surface treatment because, after the cutting operation, no additional surface-processing steps are required for the surface machining. For this reason, conventional one-piece friction rings can also be used as the one-piece basic element.

The very fine hydrojet or water torch generates only a minimal cutting gap, resulting in a low loss of material, and the individual ring segments can therefore be fitted into one another with a very accurate fit. This separation gap caused by the cutting, is in the one millimeter range, which virtually ensures a contact of the end areas of the individual ring segments. When the ring segments are connected, no additional measures are generally required to fix the position of the individual elements with respect to one another. When the individual ring segments are mounted, the connection is capable of absorbing all circumferential tensions on the friction ring.

The technique of hydrocutting, particularly water torch cutting, is a type of mechanical separation which, in addition to its suitability for very complex shapes and undercuts, permits a machining with very little deformation in the area of the cut. As a result, no additional surface treatment of the separation surfaces is required after the cutting operation.

Few limits are set as far as the types of used materials that may be used. Metals of various types, such aluminum alloys, nonferrous metals, or even glass, laminated glass, ceramics, and plastic materials as well as composite materials can be worked. The high environmental compatibility in comparison to other separation processes is particularly advantageous. This also does not result in additional tool costs and requires only very low mounting costs.

Another advantage of the inventive process is the fact that even thick friction rings can be cut with low tolerances, in which case the cutting operation takes place in an environmentally friendly manner and with very little thermal or mechanical deformation. Complex shapes, particularly with respect to the design of the recesses and protrusions, can therefore be easily produced. This separation process also does not set any limits to the arrangement of the separation points with respect to their mutual spacing, regularity, or symmetry.

In order to be able to manufacture also very thin friction rings consisting of at least two ring segments at reasonable cost, the junction or separation area is reinforced on the uncut basic element so that the connection elements can be enclosed within the junction or separation area. The area may be reinforced by an accumulation of additional material, or by making the junction and separation area thicker.

In this reinforced area, a passage opening, preferably in the form of a passage bore, is made in the radial direction. The passage bore is preferably made before the segments are cut. The friction ring can then be separated already in the finished condition by means of the water torch process.

During the hydrocutting, the energy required for the separation is applied by a liquid jet flowing through a very fine ceramic or precious-stone nozzle. There are numerous possibilities for the construction the water torch. Only a few examples will be discussed here. A relatively high pressure is required to create the fine water jet. Therefore, an oil admission pressure is generated in a primary circulation system usually using a high-pressure hydraulic pump. This oil admission pressure is converted into a high water pressure in a secondary circulation system. The high-pressure pump should generate a water pressure of up to approximately 3,800 bar, which flows through the water nozzle in the cutting head at a approximately 2.5 times the velocity of sound. A cutting agent of an extremely fine grain is supplied to the directed water jet in the mixing chamber, in order to create a microcutting. For this purpose, a vacuum assists in urging the abrasive agent from the storage container and into the chamber. After the removal of the abrasive agent from the storage container, this agent is supplied to a metering device. Here, the abrasive quantity may be selectively adjusted as required for the cutting task.

The abrasive jet will then be newly directed onto the workpiece. A fine-grained olivine sand or granite sand as well as corundum can be used as the abrasive. The harder the material of the friction ring, the better the removal performance. The abrasive unit essentially has the following components: abrasive cutting head, abrasive metering system, controlled inlet/outlet valve and abrasive container for the permanent providing of several different cutting additions.

During the high-power abrasive operation, residual energy may be dissipated by an energy absorber integrated in the water tank.

The friction ring produced by the inventive process can be used in vehicles having disk brakes. The brake disk comprises at least one friction ring which can be acted upon on one side by at least one brake shoe and which consists of at least two ring segments each held on a carrier body. The end areas of the ring segments engage one another while maintaining a small gap therebetween. The segments are coupled with one another by means of connecting devices. The invention comprises the following possible ways of coupling the segments:
  a) Coupling by means of one connection element respectively in the region of the separation or junction areas;
  b) coupling by means of several connection elements respectively in the region of the separation or junction areas.

In the former case, the connection elements are arranged generally along radii of the brake disk, which therefore permits a hinged connection between the individual friction ring elements. In this case, the hinge axis is aligned such that it is situated essentially in a plane which extends perpendicularly to the diameter the brake shoe or of the friction ring. With respect to the implementation of the articulated connection, a large number of possibilities exist, in which case at least one hinge is provided. This hinge has a hinge axis which extends in the radial direction along at least a portion of the course or dimension of the friction ring in the radial direction. Relative to the axis of symmetry of friction ring, the hinge axis extends perpendicularly. In this case, the hinged connection permits at least one swivelling movement of the two friction ring segments which are coupled with one another. During relative movements of the individual friction ring segments against one another, particularly during the implementation of the swivelling movement corresponding to the hinged connection, as it may be desired particularly when a friction ring segment is removed, damage by frictional work is avoided.

The connection elements are arranged in the area of the meshing of the protrusions and recesses and extend through the protrusions of the first ring segment and of the second ring segment.

In either of the above-mentioned cases, connection elements are used in the form of connection pins, plug-type bolts, screws, or pins to displacement in the radial direction as a result of the centrifugal effect. These devices can be formed either directly by the connection element or by a separate element which can be coupled with the connection element.

There are numerous embodiments regarding the arrangement of the protrusions and recesses on the two respective mutually facing surfaces of the individual friction ring segments:
  a) alternately at a constant distance;
  b) alternately at a different distance or a different width of the individual protrusions and recesses, in which case care should be taken that complementary recess and protrusions are provided in each case on the complementary component.

The mutually facing surfaces of the mutually adjacent ring segments are also called junction surfaces or separation surfaces, the term "junction surface" essentially relating to the fact that the two surfaces come in contact with one another at least indirectly, while the term "separation point" relates to the producing of the ring segment according to the invention. In the case of the further development of the junction and separation surfaces, each has partial areas which are radially aligned and also areas which are perpendicular to the radial direction, or at an angle thereto.

Under another aspect of the invention, devices may be provided to reduce relative radial displacement of the ring segments with respect to one another of the gap which, although it is small, occurs during the separation operation according to the invention corresponding devices are provided. These may, for example, comprise a) spacers in the separation gap and/or
b) adjusting screws and/or
c) plain washers at the end of the connection elements and/or
d) sliding guides between the ring segments and the elements forming the holding device for the ring segments.

The spacers are preferably arranged in the partial areas of the separation gap which extend or are aligned in the circumferential direction. Analogously, this applies to the use of adjusting screws which also act in the separation gap areas aligned in the circumferential direction.

Furthermore, the invention is suitable for the manufacturing of friction rings for brake disks for applications having high rotational speeds.

In another embodiment of the invention, a high bending strength of the friction ring is achieved by a multiple-shear connection of the individual friction ring segments with one another. Passage openings are provided in the separation area. Preferably, at least two openings are provided and are arranged parallel to one another and permit the accommodation of connection elements. In either the, the passage openings are radially aligned.

Under another embodiment of the invention, the separation gap is filled with a special element, for example, a sheet metal strip. The wheel brake disk will then resist bending in the separation area and, in the circumferential direction, will act similarly to an undivided friction ring. This special element can be made as one piece, or may be a multipiece construction. However, care should be taken that, in the areas of the separation gap, the sheet metal strip has an opening for receiving the connection elements. The individual special elements, particularly the sheet metal strips, extend at least along a partial area of the separation gap. An embodiment with a complete filling of the separation gap in the width direction is also conceivable. In this case, corresponding passage openings for the connection elements would have to be provided, while in the other case only recesses would have to be provided on the sheet metal strip.

According to the invention, a further development of a friction ring made of several ring segments is shown. These individual ring segments mesh with one another and are coupled with one another by way of at least one connection device.

As a result of this type of connection, the two friction ring segments are sufficiently secured in the axial as well as in the radial direction and, in addition, in the circumferential direction.

In the following, the invention according to the invention will be explained by means of figures.

Other objects, advantages and novel features of the present invention will become apparent from the following detailed description of the invention when considered in conjunction with the accompanying drawings.

BRIEF DESCRIPTION OF THE DRAWINGS

FIG. 2 is a view of a cutout from a friction ring in the junction or separation area.

FIG. 4 is a view of another arrangement of the connection elements in the junction and separation area.

DETAILED DESCRIPTION OF THE PREFERRED EMBODIMENTS

Figure 1:
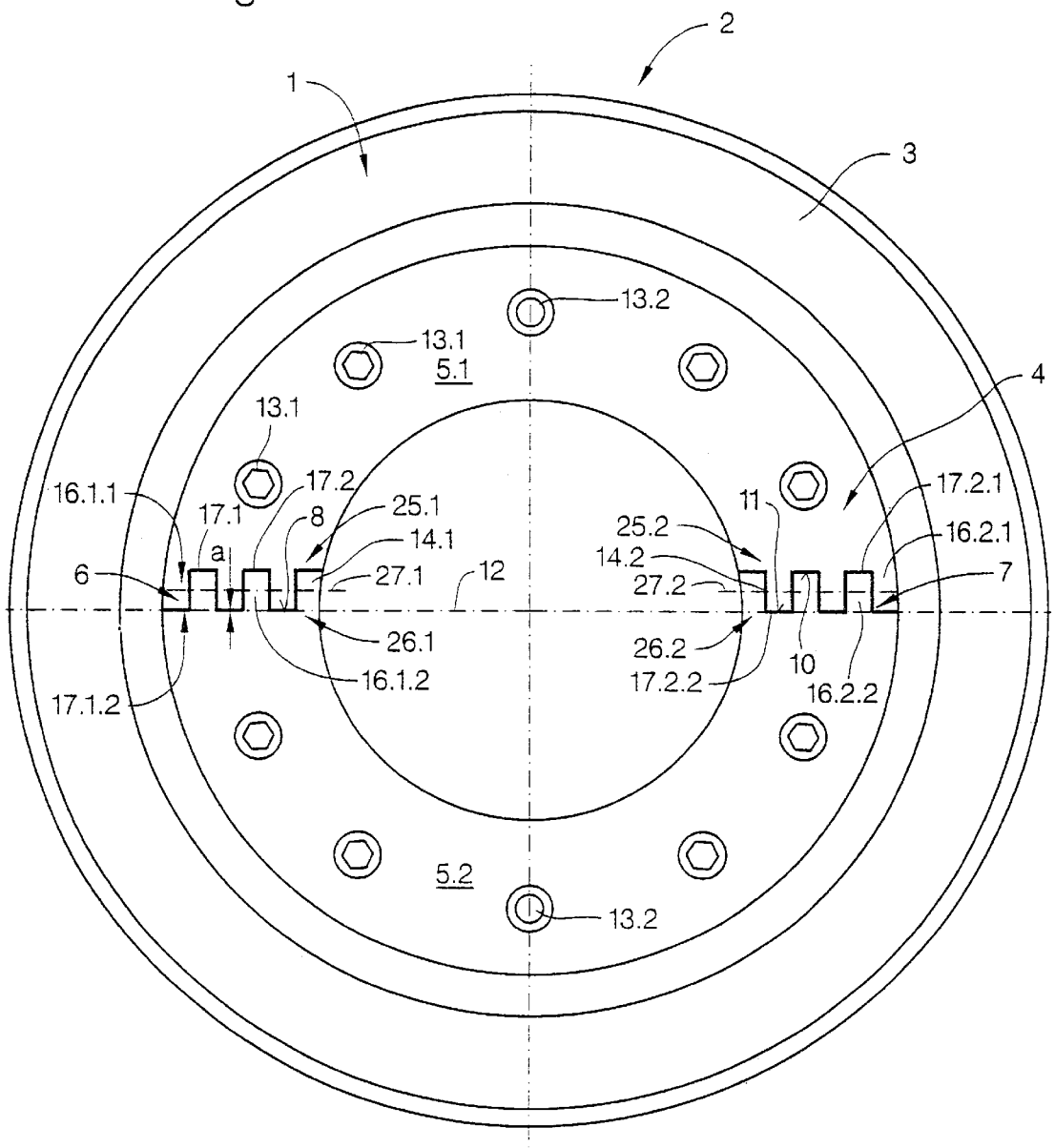
FIG. 1 is a simplified representation of a brake disk designed according to the principles of the present invention.

FIG. 1 is a simplified view of a brake disk 1 in the form of a wheel brake disk on a rail vehicle wheel 2. On its wheel disk 3, the vehicle wheel 2 carries a brake ring in the form of a friction ring 4. The friction ring 4 is divided into at least two ring segments 5.1 and 5.2, which are constructed in the shape of half-rings. In the installed position, the ring segments 5.1 and 5.2 are connected with one another in their junction and separation areas 6 and 7 which are the areas characterized by the mutual facing of the individual surfaces 8, 9 aligned in the circumferential direction for the junction or separation area 6, and 10 or 11 for the junction or separation area 7.

The junction area is the area which is characterized by the course of the surfaces 8, 9 and 10, 11 in the circumferential direction during the theoretical abutting of the individual end areas of the two ring segments 5.1 and 5.5 under stress, which ring segments 5.1 and 5.2 are arranged mutually adjacent in the circumferential direction. The term "separation area" relates to the course of the surfaces 8, 9 and 10, 11 in the circumferential direction which are formed during the separation operation.

The junction and separation areas 6 and 7 are situated in a common plane 12 containing the axis of the vehicle wheel 2. In the junction and separation areas, the surfaces 8, 9 and 10, 11 are essentially aligned in the circumferential direction. These surfaces 8, 9, 10, and 11 also called the faces of the ring segments 5.1 and 5.2, are essentially parallel to one another with a separation gap 28 therebetween. The two ring segments 5.1 and 5.2 are fastened on the wheel disk 3 by fastening devices 13.1, 13.2 extending parallel to the axis of the vehicle wheel 2. The devices may be screws 13.1 and clamping sleeves 13.2. For braking, a brake shoe, (not shown in detail), can be pressed against the brake ring 4. Facing the wheel disk 3, the friction ring 4 or the two ring segments 5.1 and 5.2 forming this friction ring 4 can be provided with ventilation devices, for example, radially directed cooling air ribs for delivering a cooling air flow between the friction ring 4 and the wheel disk 3.

The ring segments 5.1 and 5.2 are adjacent to one another are connected in the junction and separation area 6 and 7 in each case by means of connection devices 27.1 and 27.2 which are outlined in FIG. 1. As shown, for coupling the end area 25.1 with 26.1 and 25.2 with 26.2 of the ring segments 5.1 and 5.2, only one connection device 27.1 and 27.2 respectively is provided. This permits an articulated connection between the ring segments 5.1 and 5.2. The connection devices 27.1 and 27.2 comprise devices 14.1 and 14.2 for the articulated connection of the ring segments 5.1 and 5.1 which follow one another when viewed as a constructional unit in the circumferential direction of the friction ring 4.

These ring segments 5.1 and 5.2 have the reference number 14.1 in the junction and separation area 6, and the reference number 14.2 in the junction and separation area 7. The articulated connection may have different constructions; however, a hinge connection is preferred. This is implemented in the most simple manner by the corresponding design of the individual ring segments 5.1 and 5.2 in the junction and separation area 6 and 7 and the connection of the two ring segments 5.1 and 5.2 in the junction and separation areas 6 and 7 by means of at least one connection element 15. The two friction ring segments 5.1 and 5.2 have a reinforced thickness in the junction and separation area 6 and 7, in this reinforced area, the guides for the connection elements being worked in. In addition, the end areas 25.1, 25.2, 26.1 and 26.2 are constructed such that, viewed in the circumferential direction of the friction ring 4, these end areas engage with one another at a distance a. The friction ring segments 5.1 and 5.2 have, in the junction and separation area, on mutually facing surfaces 8 and 9 as well as 10 and 11, protrusions 16 and recesses 17 which are complementary to one another.

The protrusions 16 on the ring segment 5.1 in the area of the junction and separation area 6 have the reference number 16.1.1, and the recesses 17 have the reference number 17.1.1, while the protrusions in the junction and separation area 7 have the reference number 16.2.1 and the recesses have the reference number 17.2.1.

The protrusions 16.1.1 in the junction and separation area 6 engage in recesses 17.1.2, which are complementary thereto, on the ring segment 2 in the junction and separation area 6, and the recesses 17.1.1 surround corresponding protrusions 16.1.2 on the ring segment 5.2 in the junction and separation area 6. Analogously, this applies to the protrusions 16.2.1 in the junction and separation area 7 which interact with corresponding recesses 17.2.1, and the recesses 17.2.1 which surround corresponding protrusions on the ring segment 5.2 in the junction and separation area 7.

By providing protrusions 16 and recesses 17, essentially no plane surface 8 and 9 is obtained in the radial direction in the end area 25.1 on the ring segment 5.1 and 26.1 on the ring segment 5.2, but a further development in the manner of a form-locking connection, in which case, however, the coupling between the ring segments 5.1 and 5.2 in the junction and separation area 6 and 7 takes place by way of the connection elements 15 which extend in the radial direction in the junction and separation area 6 and 7 in each case through the first and the second ring segment 5.1 and 5.2.

Preferably one the of the connection elements 15 will align with a radius of the friction ring 4; however, deviations are also conceivable. If the mutually facing surfaces 8 and 9 have different surface areas which are formed by the protrusions 16 and the recesses 17, in which case these are preferably either aligned with or perpendicular to. Other embodiments with different slopes are also conceivable.

The separation gap 28 ensures some mobility, and is preferably smaller than 1 mm.

Two possibilities exist for the arrangement of the protrusions 16 and the recesses 17 on the two respectively mutually facing surfaces 8 and 9 as well as 10 and 11 of the individual ring segments 5.1 and 5.2: The arrangement of the protrusions or recesses may be at a constant spacing or at a varying spacing, in the illustrated case, an alternative arrangement with a constant spacing being selected.

FIG. 2 shows a schematic of a cutout from a friction ring 4.2 and illustrates the requirements for the cost-effective and simple production of the ring segments 5.1 and 5.2 from a basic element 30. The undivided friction ring 4 is produced as a one-piece or one-part ring-shaped element, for example, as a casting. The junction and separation areas 6 and 7, here illustrated for junction area 6, have a reinforced construction. This may be implemented by an accumulation of material. This reinforced area 18 does not have to be congruent with the junction or separation area 6 or 7. The separation in the junction or separation areas 6, 7 is created by the water torch cutting technique. The separation gap 29 is constructed such that the two separation surfaces 8 and 9 are situated opposite one another have protrusions 16 and recesses 17 which engage in recesses 17 on the other opposite friction ring segment, or surround another protrusion while maintaining the separation gap 28. The previously undivided friction ring 4.2 is machined to a finished stated in the undivided condition and is only then separated by means of the water torch cutting technique. The cut is made such that, after the division, virtually two hinge halves are created in the form of the ring segments 5.1 and 5.2. However, friction ring constructions with a plurality of ring segments are also conceivable.

The applied water torch cutting method is a process for the mechanical separation which permits a machining without any deformation of material and change of structure in the marginal zone area. With respect to the application range, no limits are set with respect to the type of the used materials. This means that the friction ring can also be produced from many different materials, such as metals or other materials.

With respect to the implementation of the method, published information is available from:

1. The website for ESAB Cutting Systems—ESAB-HANCOCK GmbH
2. A publication titled "Die Technologie des Wasserstrahlschneidens", which can be found at the website gicc.de.

The disclosure of the above-referenced published information with respect to the described technique of the hydrocutting process, particularly the water torch cutting process, and, furthermore, of the used device is fully included in the application.

The two ring segments 5.1 and 5.2 are coupled together in the junction and separation areas 6 and 7 by means of the connection elements 15. As shown, element 15.1 is positioned in junction or separation area 6, and is aligned with the radius of the wheel, which corresponds to the radius of the friction ring. The corresponding passage opening, which extends alternately through the protrusions 17 on the mutually opposite end areas 25.1 and 16.1, has the reference number 20.1. The passage opening preferably extends through the whole course of the friction ring 4.2 in the radial direction and also extends in this direction. However, other constructions are also conceivable in which the position of the axis of the passage opening is disposed at an angle from a radius of the wheel.

Figure 3A:
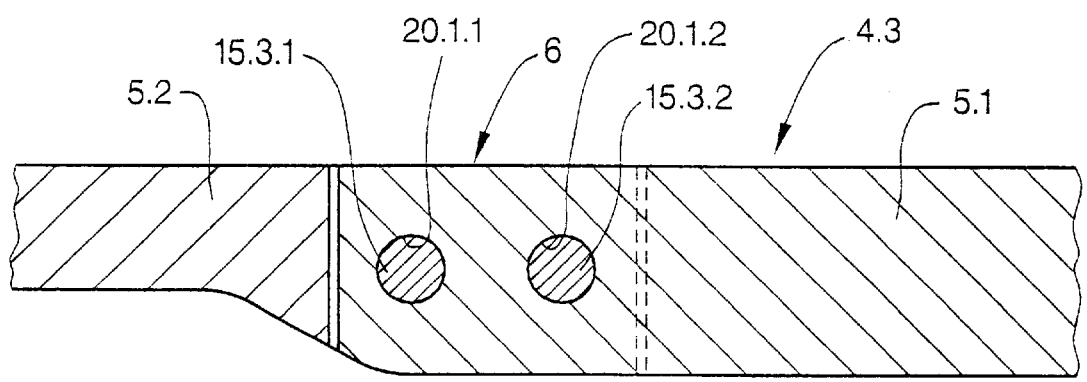
FIGS. 3a and 3b are schematically simplified views of an embodiment of a brake disk designed according to the invention having two connection elements in the junction and separation area.
Figure 3B:
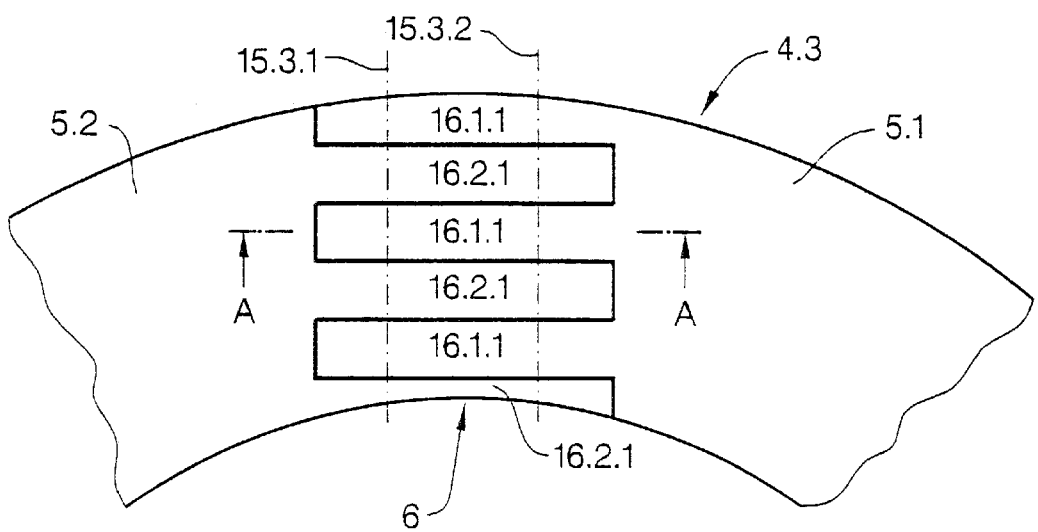

FIGS. 3a and 3b are in two views of a cutout from a friction ring 4.3 and illustrate another advantageous embodiment which achieves a high bending strength, in that a multishear connection of the individual friction ring segments 5.1 and 5.2 is carried out. For this purpose, in the junction or separation area 6 or 7, at least two guides respectively are provided for connection elements 15. These guides in the form of passage openings have the reference numbers 20.1.1 and 20.1.2 for the junction or separation area 6. These extend alternately through the protrusions 16.1.1 and 16.2.1 on the ring segments 5.1 and 5.2.

The two passage openings 20.1.1. and 20.1.2 may be arranged parallel to one another and at an angle to a theoretical connection line between the axis of symmetry of the wheel and the outer circumference of the friction ring in the radial direction and permit the accommodation of the connection elements, which here have the reference numbers 15.3.1 and 15.3.2 for the junction and separation area 6. FIG. 3a is a sectional view through the friction ring 4.3 in the junction or separation area 6 in a plane A—A according to FIG. 3b parallel to the axis of symmetry of the wheel, while FIG. 3b, also in a very simplified representation, reflects a cutout of a view onto the friction ring 4.3.

FIG. 4 shows a modification of the coupling of the ring segments 5.1 and 5.2. The guide 20.4.1 and 20.4.2 for accommodating the connection elements 15.4.1 and 15.4.2, which are constructed as passage openings extending through the protrusions 17 on the first and second ring segment, is constructed such that these are each aligned in the radial direction. This means that no parallelism is provided between the two guides or passage openings 20.4.1 and 20.4.2.

In the embodiments described in FIGS. 1 to 4, pins or riveted elements can be used as connection elements, in the case of an unmachined passage opening, these, for example, being through-pins. In this case, at least on both sides of the ring segments, corresponding stop elements are provided in the radial direction, for example, in the form of a head constructed in one piece with the connection element or with separate head elements which are screwed onto the pin. Another possibility of the construction is a threading in the passage opening for receipt of a threaded connection element 15. However, long threading should be provided which, before the separation of the basic element 40, should be worked into the individual ring segments, for example 5.1 and 5.2, in the junction and separation area. In all figures, the meshing of the individual ring segments 5.1 and 5.2 always takes place while forming the separation gap 28.

Figure 5A:
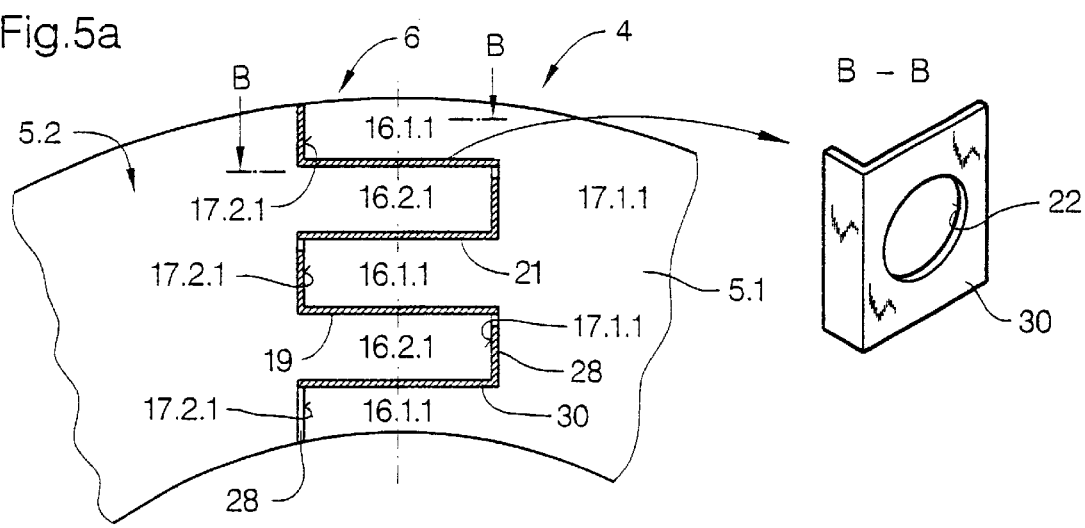
FIGS. 5a and 5b are views of another embodiment according to the invention principles of the invention.
Figure 5B:
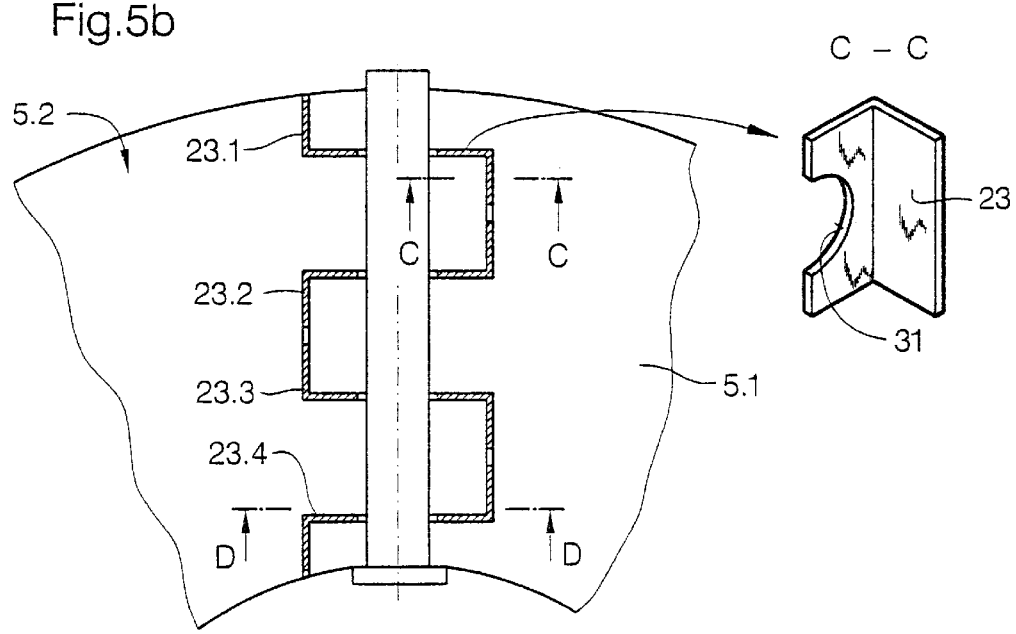
Figure 5C:
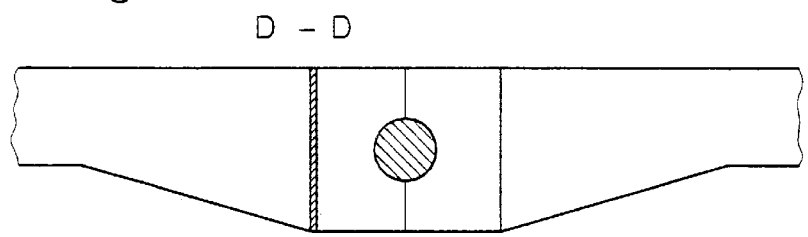
FIG. 5c is a partial cross-sectional view of FIG. 5b along line D—D.

FIGS. 5a and 5b illustrate another embodiment of the solution according to the invention. For avoiding a lifting-off of the junction and separation area due to heat, fastening screws for the brake disk cannot hold the friction ring 4 in a flat manner with respect to the brake disk. Instead, special elements or devices can be provided in the junction or separation area 6 and 7, in at least a partial area of the radial course of the friction ring 4, which devices construct the ring segments 5.1 and 5.2 in the junction or separation area 6 and 7 to be resistant to bending and in the circumferential direction of the friction ring 4 to be elastic.

According to FIG. 5a, the devices 21, comprise a sheet metal strip 30 positioned in the gap 28 and in the junction or separation area 6, and is guided around the protrusions 16.1.1, 16.2.1 and the recesses 17.1.1 and 17.2. in a meandering manner corresponding to their design. As shown, the sheet metal strip 30 is constructed in one piece; however, constructions with several individual sheet metal strips are also conceivable. As shown in FIG. 5a, passage openings to guide the connection elements 15 are the areas aligned with the radius. The passage openings 22 are preferably constructed with a larger diameter in order to allow tolerance. In order to obtain an optimal result, a complete filling of the separation gap 28 by the devices 21 is preferred. The sheet metal strip 30 therefore has a width which corresponds to the width of the friction ring 4.

However, a construction according to FIG. 5b is also conceivable, in which the devices comprise sheet metal strip elements 23.1 to 23.4 which may, for example, form a unit. These may extend, as illustrated in FIG. 5a, along the entire width of the friction ring 4, or only along a portion of the width of the friction ring 4. The connection element 15 or the connections elements will then be only partially enclosed by the sheet metal strip elements 23.1 to 23.4. In order to avoid collisions with the connection elements 15, the sheet metal strip or the sheet metal strip elements 23.1 to 23.4 have a recess 31 with an open edge.

Figure 6A:
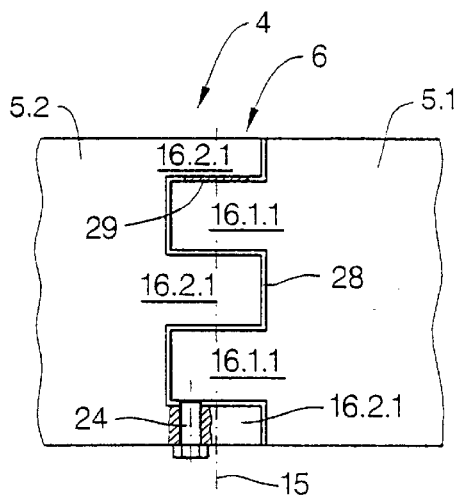
FIGS. 6a to 6c are views of possibilities for fixing the position of the individual ring segments.
Figure 6B:
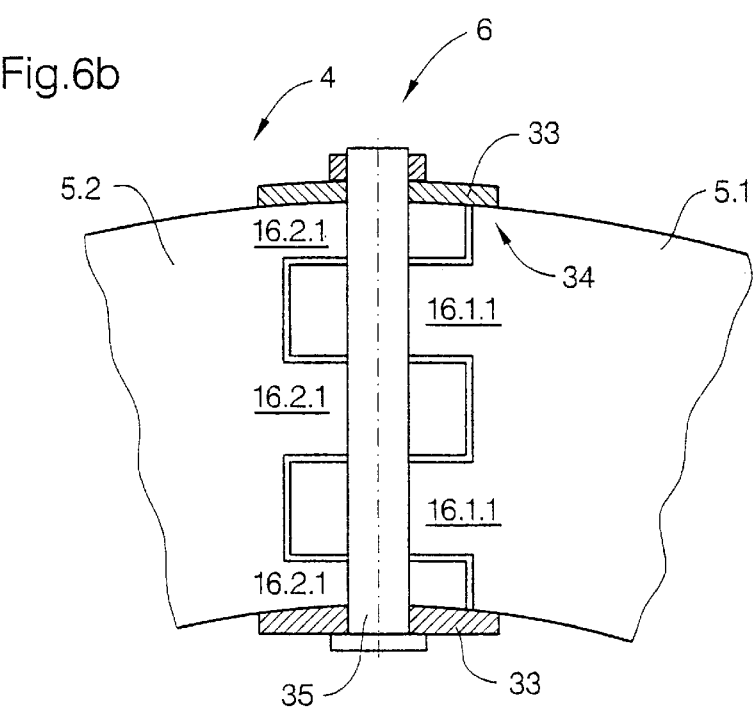
Figure 6C:
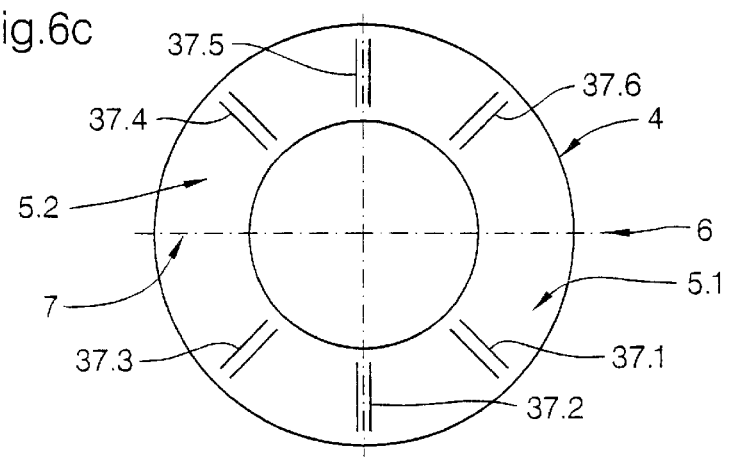

FIGS. 6a to 6c illustrate different possibilities for securing the ring segments 5.1, 5.2 with respect to one another. These can be used individually or in combination with one another. At least one spacer 29 may be placed in the separation gap 28. The spacer 29 is preferably arranged in part of the separation gap 28 that is aligned in the circumferential direction of the friction ring 4 and of the individual ring segments 5.1 and 5.2.

Another possibility consists of the use of adjusting screws 24 that extend through a partial area of one of the ring segments into the separation gap 28 in the radial direction and can be adjusted by threading.

FIG. 6b illustrates a possibility of fixing the position, which can be easily implemented, by providing plain washers 33 in the end area 34 of the connection elements 15, here, of a bolt 35. When the bolt 35 is tightened, the two ring segments 5.1 and 5.2, which are mutually adjacent in the circumferential direction, are braced against one another.

FIG. 6c is a schematical view of another possibility of fixing the position of the ring segments 5.1 and 5.2 in the radial direction. The segments 5.1 and 5.2 can be fixed by a plurality of sliding guides which are aligned in the radial direction. Each ring segment 5.1, 5.2 carries at least one element of the guide, such as sliding blocks 37. For each ring segment, a certain number of sliding blocks 37 are provided, which here have the reference numbers 37.1 to 37.3 for the ring segment 5.1, and 37.4 to 37.6 for the ring segment 5.2.

Figure 7A:
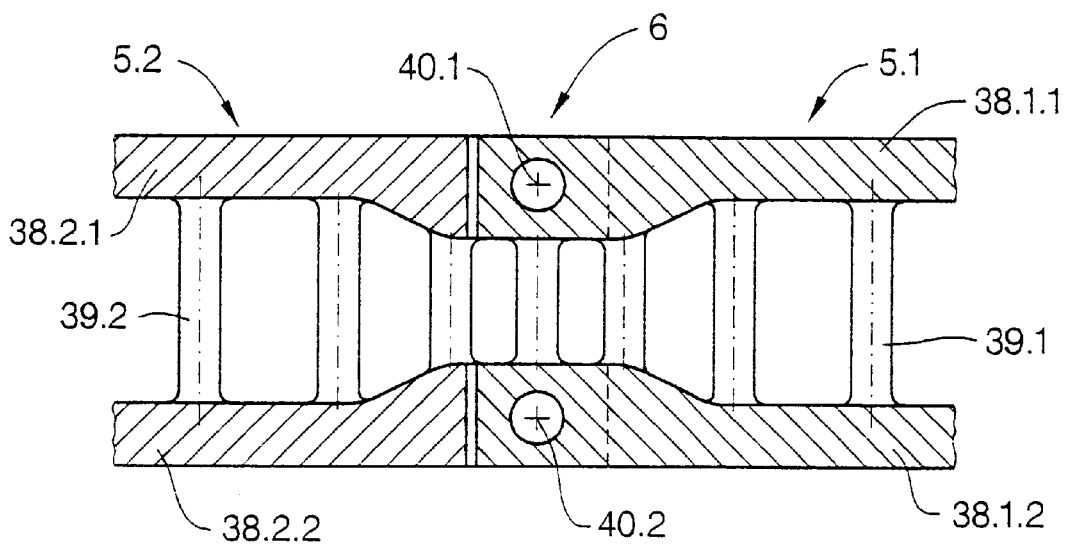
FIGS. 7a and 7b are views of two embodiments for the use of the method according to the invention.
Figure 7B:
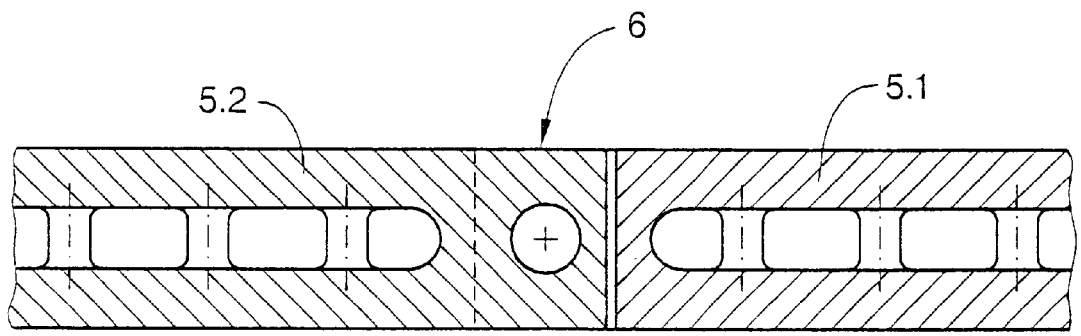

The inventive method is suitable for any construction of fiction rings, independently of their thickness or design. FIGS. 7a and 7b illustrate the application of the method according to the invention on two differently designed friction rings 4.7.1 and 4.7.2.

According to FIG. 7a, reference number 4.7.1 indicates a stronger friction ring whose ring segments 5.1 and 5.2 each comprise two disk-shaped elements 38.1.1, 38.1.2 and 38.2.1, 38.2.2, which are coupled with one another by way of cooling webs 39.1 and 39.2. In the junction or separation area 6, at least one connection element respectively 40.1 is provided in the coupling area of the individual disk-shaped elements 38.1.1 and 38.2.1, and one connection element 40.2 is provided in the coupling area of the individual disk-shaped elements 38.1.2 and 38.2.2.

FIG. 7b illustrates an application in a thin brake disk 1, in which case, with respect to the construction of the junction and separation area 6 and 7 and of the coupling of the two ring segments 5.1 and 5.2 to be connected with one another, reference can be made to the statements concerning FIGS. 1 to 6.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method for producing a friction ring having at least two ring segments, the friction ring being suitable for a brake disk, comprising the steps of:

providing a one-piece, ring-shaped basic element;

cutting the basic element into at least two ring segments using a hydrocutting process to form a separation gap between adjacent end areas of the ring segments, and form a junction and separation area near the adjacent end areas; and joining the adjacent end areas at the junction and separation area by at least one connection device.

2. The method according to claim 1, further comprising the step of treating a surface of the basic element to a final surface treatment before the ring segments are cut from the basic element.

3. The method according to claim 1, further comprising the step of creating a guide in a radial direction for the at least one connection device through at least a portion of one of the end areas of mutually adjacent ring segments.

4. The method according to claim 3, wherein guides are at an angle with respect to a diameter and an outer circumference of the friction ring.

5. The method according to claim 3, further comprising the step of forming the junction and separation areas to be thicker than remaining portions of the friction ring.

6. The method according to one of claim 3, wherein the guides are created by the step of forming passage openings in the end areas for receipt of the connection devices.

7. The method according to claim 6, wherein the passage openings are formed before the basic element is cut into segments.

8. The method according to claim 1, wherein the cutting further forms complementary recesses and protrusions having constant radial spacing and dimension.

9. The method according to claim 1, wherein the cutting further forms complementary recesses and protrusions having varied radial spacing and dimension.

10. The method according to claim 1, further comprising the step of providing a plurality of connection elements in the junction and separation area in order to increase the bending strength of the friction ring.

11. The method according to claim 1, further comprising the step of providing devices in the separation gap for preventing relative radial displacement of the ring segments.

12. The method of claim 1, wherein the cutting creates complementary recesses and protrusions having at least radial spacing.

13. The method of claim 1, wherein the at least one connection device creates circumferential spacing between complementary recesses and protrusions.

* * * * *